US009771888B2

(12) United States Patent
Packard et al.

(10) Patent No.: US 9,771,888 B2
(45) Date of Patent: Sep. 26, 2017

(54) SYSTEM AND METHOD FOR CONTROLLING AN ENGINE BASED ON AN OXYGEN STORAGE CAPABILITY OF A CATALYTIC CONVERTER

(71) Applicant: GM Global Technology Operations LLC, Detroit, MI (US)

(72) Inventors: Jonathan Packard, Madison Heights, MI (US); Robert J. Genslak, Macomb, MI (US); Scott Jeffrey, Hartland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 255 days.

(21) Appl. No.: 14/056,994

(22) Filed: Oct. 18, 2013

(65) Prior Publication Data

US 2015/0107554 A1    Apr. 23, 2015

(51) Int. Cl.
*F02D 41/02* (2006.01)
*F02D 43/00* (2006.01)
*F02D 41/08* (2006.01)
*F02D 41/14* (2006.01)
*F02P 5/15* (2006.01)
*F02D 41/12* (2006.01)

(52) U.S. Cl.
CPC ......... *F02D 43/00* (2013.01); *F02D 41/0235* (2013.01); *F02D 41/08* (2013.01); *F02D 41/126* (2013.01); *F02D 41/1441* (2013.01); *F02P 5/1506* (2013.01); *F02P 5/1508* (2013.01); *F02D 41/123* (2013.01); *F02D 2200/0802* (2013.01); *F02D 2200/0816* (2013.01); *Y02T 10/46* (2013.01); *Y02T 10/47* (2013.01)

(58) Field of Classification Search
CPC ...... F02D 43/00; F02D 41/0235; F02D 41/08; F02D 41/126; F02D 41/1441; F02D 41/064; F02D 37/02; F02D 41/1454; F02D 2200/0816; F02P 5/1506; F02P 5/1508; Y02T 10/46; Y02T 10/47; F01N 13/009
USPC ...... 123/672, 691, 692; 701/109; 73/114.73; 60/276, 285
See application file for complete search history.

(56) References Cited

U.S. PATENT DOCUMENTS

| | | | |
|---|---|---|---|
| 5,289,678 A * | 3/1994 | Grutter | F01N 11/007 60/274 |
| 6,581,371 B1 * | 6/2003 | Orzel | F01N 11/00 60/274 |
| 6,802,181 B2 | 10/2004 | Wang et al. | |
| 6,874,313 B2 | 4/2005 | Yurgil et al. | |
| 7,168,239 B2 * | 1/2007 | Ingram | F01N 3/2006 60/274 |
| 7,444,235 B2 | 10/2008 | Anilovich et al. | |
| 7,900,439 B2 | 3/2011 | Genslak et al. | |
| 8,516,796 B2 | 8/2013 | Wald et al. | |

(Continued)

*Primary Examiner* — Hai Huynh
*Assistant Examiner* — Gonzalo LaGuarda

(57) ABSTRACT

A system according to the principles of the present disclosure includes a storage capability module and at least one of an engine speed control module and a spark control module. The storage capability module determines a capability of a catalytic converter to store oxygen. The engine speed control module controls a speed of an engine based on the oxygen storage capability of the catalytic converter. The spark control module controls a spark timing of the engine based on the oxygen storage capability of the catalytic converter.

26 Claims, 3 Drawing Sheets

(56) References Cited

U.S. PATENT DOCUMENTS

| | | | |
|---|---|---|---|
| 9,037,383 B2* | 5/2015 | Okazaki | F02D 41/1441 55/385.3 |
| 2001/0025485 A1* | 10/2001 | Kobayashi | F02D 41/0295 60/285 |
| 2002/0139110 A1* | 10/2002 | Brown | F01N 3/2006 60/284 |
| 2003/0017603 A1 | 1/2003 | Uchida et al. | |
| 2003/0051463 A1* | 3/2003 | Kobayashi | F01N 11/00 60/274 |
| 2003/0150208 A1* | 8/2003 | Hirata | F01N 3/32 60/285 |
| 2003/0159432 A1 | 8/2003 | Kobayashi et al. | |
| 2004/0144079 A1* | 7/2004 | Nagai | B01D 53/9495 60/276 |
| 2004/0244361 A1 | 12/2004 | Tanabe et al. | |
| 2005/0252196 A1 | 11/2005 | Aliakbarzadeh et al. | |
| 2006/0021326 A1* | 2/2006 | Midlam-Mohler | B60K 6/48 60/278 |
| 2007/0227123 A1 | 10/2007 | Iida et al. | |
| 2008/0115486 A1 | 5/2008 | Yurgil | |
| 2008/0184695 A1 | 8/2008 | Anilovich et al. | |
| 2008/0184697 A1* | 8/2008 | Kojima | F01N 3/0814 60/286 |
| 2008/0229727 A1 | 9/2008 | Wang et al. | |
| 2008/0302087 A1 | 12/2008 | Genslak et al. | |
| 2008/0306673 A1 | 12/2008 | Yasui et al. | |
| 2009/0266054 A1 | 10/2009 | Iihoshi et al. | |
| 2009/0288391 A1 | 11/2009 | Aoki | |
| 2009/0293451 A1 | 12/2009 | Kesse | |
| 2010/0101214 A1 | 4/2010 | Herman et al. | |
| 2010/0288231 A1* | 11/2010 | Zumbaugh | F02D 37/02 123/406.12 |
| 2012/0210699 A1* | 8/2012 | Ruhland | F01N 3/023 60/274 |
| 2015/0045185 A1* | 2/2015 | Doering | B60W 10/02 477/181 |

\* cited by examiner

SYSTEM AND METHOD FOR CONTROLLING AN ENGINE BASED ON AN OXYGEN STORAGE CAPABILITY OF A CATALYTIC CONVERTER

FIELD

The present disclosure relates to internal combustion engines, and more specifically, to systems and methods for controlling an engine based on an oxygen storage capability of a catalytic converter.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

SUMMARY

A system according to the principles of the present disclosure includes a storage capability module and at least one of an engine speed control module and a spark control module. The storage capability module determines a capability of a catalytic converter to store oxygen. The engine speed control module controls a speed of an engine based on the oxygen storage capability of the catalytic converter. The spark control module controls a spark timing of the engine based on the oxygen storage capability of the catalytic converter.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A catalytic converter contains a catalyst that reacts with exhaust gas from an engine to reduce emissions such as nitrogen oxide, carbon monoxide, and hydrocarbon. The catalyst may store oxygen when the engine operates at a lean air/fuel ratio, and the catalyst may release oxygen when the engine operates at a rich air/fuel ratio. The oxygen released may react with exhaust gas to reduce emissions such as carbon monoxide and hydrocarbon.

As the catalyst ages, the oxygen storage capability of the catalyst diminishes. In turn, the catalyst may be less effective in reducing emissions, especially during a cold start or during a period following a fuel cutoff event such as a deceleration fuel cutoff or a clutch fuel cutoff (e.g., a fuel cutoff when a transmission is shifting). For example, during the period following a fuel cutoff, the air/fuel ratio of the engine may be enriched to balance out nitrogen oxide produced by the engine during the fuel cutoff. As the catalyst ages, fuel pulses during this period tend to break through the catalytic converter, yield hydrocarbon and nitrogen oxide emissions.

To reduce emissions, a system and method according to the present disclosure adjusts operation of the engine as the oxygen storage capability of the catalyst decreases. For example, during a cold start, the system and method may increase an idle speed of the engine and/or increase an amount of spark retard to decrease a period required for the catalyst to reach an activation temperature and thereby reduce emissions. In another example, the system and method may decrease the amount of fuel enrichment after a fuel cutoff event to prevent fuel pulses from breaking through the catalytic converter and thereby reduce hydrocarbon and nitrogen oxide emissions.

Figure 1:
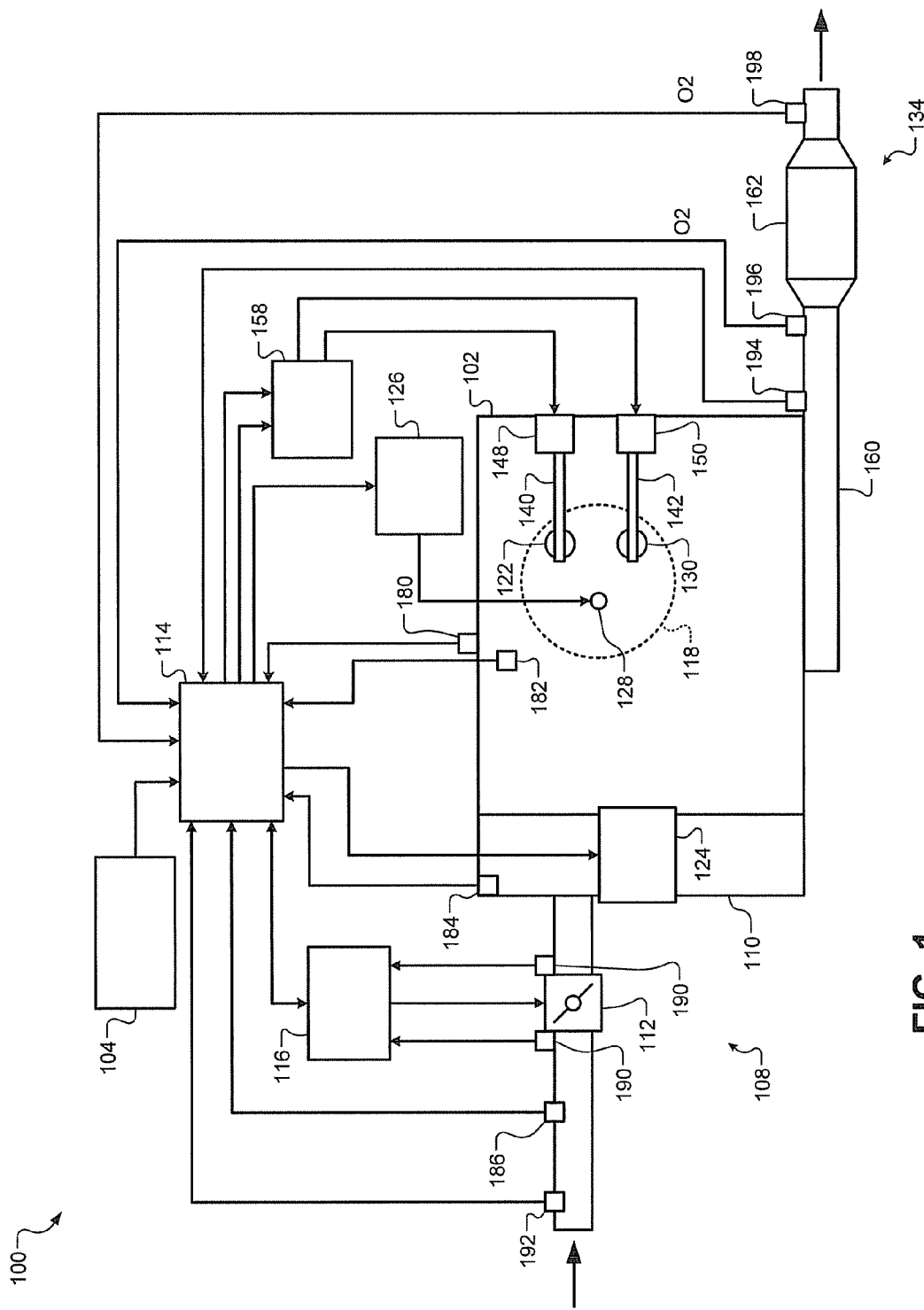
FIG. 1 is a functional block diagram of an example engine system according to the principles of the present disclosure.

Referring now to FIG. 1, an engine system 100 includes an engine 102 that combusts an air/fuel mixture to produce drive torque for a vehicle. The amount of drive torque produced by the engine 102 is based on a driver input from a driver input module 104. The driver input may be based on a position of an accelerator pedal. The driver input may also be based on cruise control system, which may be an adaptive cruise control system that varies vehicle speed to maintain a predetermined following distance. In addition, the driver input may be based on the position of an ignition switch (not shown), and the engine 102 may be started based on the driver input.

Air is drawn into the engine 102 through an intake system 108. For example only, the intake system 108 may include an intake manifold 110 and a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, the combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. A valve actuator module 158 may control the intake and exhaust cam phasers 148, 150 based on signals from the ECM 114. When implemented, variable valve lift may also be controlled by the valve actuator module 158.

The valve actuator module 158 may deactivate the cylinder 118 by disabling opening of the intake valve 122 and/or the exhaust valve 130. The valve actuator module 158 may disable opening of the intake valve 122 by decoupling the intake valve 122 from the intake cam phaser 148. Similarly, the valve actuator module 158 may disable opening of the exhaust valve 130 by decoupling the exhaust valve 130 from the exhaust cam phaser 150. In various implementations, the valve actuator module 158 may control the intake valve 122 and/or the exhaust valve 130 using devices other than camshafts, such as electromagnetic or electrohydraulic actuators.

The exhaust system 134 includes an exhaust manifold 160 and a catalytic converter 162. The exhaust manifold 160 directs exhaust gas from the engine 102 to the catalytic converter 162, which reduces emissions in the exhaust gas. The catalytic converter 162 may be a three-way catalytic converter that reduces nitrogen oxide, carbon monoxide, and hydrocarbon. The catalytic converter 162 may reduce nitrogen oxide to nitrogen and oxygen, oxidize carbon monoxide to carbon dioxide, and oxidize hydrocarbon to carbon dioxide and water. Additionally, the catalytic converter 162 may release oxygen when the engine 102 is operated at a rich air/fuel ratio and may store oxygen when the engine 102 is operated at a lean air/fuel ratio.

The engine system 100 may measure the position of the crankshaft using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The temperature of exhaust gas expelled from the engine 102 may be measured using an exhaust gas temperature (EGT) sensor 194. The oxygen level upstream from the catalytic converter 162 may be measured using a first oxygen (O2) sensor 196. The oxygen level downstream from the catalytic converter 162 may be measured using a second oxygen (O2) sensor 198.

The ECM 114 may use signals from the sensors to make control decisions for the engine system 100.

Figure 2:
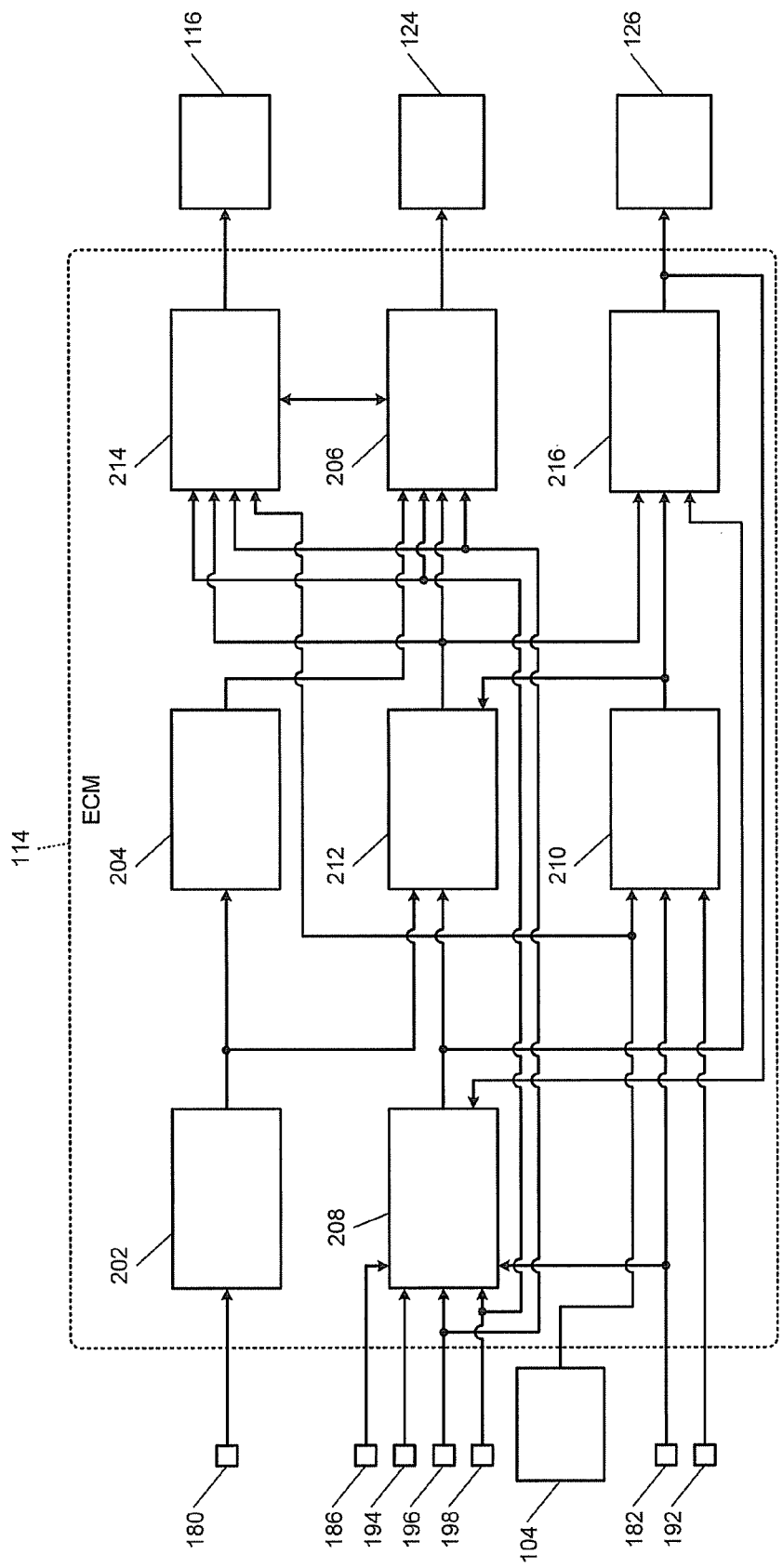
FIG. 2 is a functional block diagram of an example control system according to the principles of the present disclosure.

Referring now to FIG. 2, an example implementation of the ECM 114 includes an engine speed determination module 202. The engine speed determination module 202 determines engine speed. The engine speed determination module 202 may determine the engine speed based on the crankshaft position from the CKP sensor 180. For example, the engine speed determination module 202 may determine the engine speed based on a period of crankshaft rotation corresponding to a number of tooth detections. The engine speed determination module 202 outputs the engine speed.

A fuel cutoff module 204 selectively stops fuel delivery to one or more (e.g., all) cylinders of the engine 102 based on engine operating conditions to improve fuel economy and reduce emissions. For example, the fuel cutoff module 204 may stop fuel delivery when the vehicle is decelerating and/or when a transmission of the vehicle is shifting gears. The fuel cutoff module 204 outputs a signal indicating whether to stop fuel delivery to cylinders.

A fuel control module 206 controls an amount of fuel delivered to cylinders of the engine 102. The fuel control module 206 may output a desired fuel delivery amount, and the fuel actuator module 124 may adjust fuel injection to achieve the desired fuel delivery amount. During normal engine operation, the fuel control module 206 may adjust the fuel delivery amount to a first amount to achieve a stoichiometric air/fuel ratio. The fuel control module 206 may determine the air/fuel ratio of the engine 102 based on the first O2 level from the first O2 sensor 196 and the second O2 level from the second O2 sensor 198. During a fuel cutoff event, the fuel control module 206 adjusts the fuel delivery amount to zero for one or more cylinders of the engine 102 to stop fuel delivery to the cylinders. The fuel control module 206 may determine when to adjust the fuel delivery amount to zero based on instructions received from the fuel cutoff module 204.

An oxygen (O2) storage capability module 208 determines an oxygen storage capability of the catalytic converter 162. The O2 storage capability module 208 may determine the oxygen storage capability during a fuel cutoff event based on the first O2 level from the first O2 sensor 196 and the second O2 level from the second O2 sensor 198. For example, when fuel delivery to one or more cylinders is stopped, the engine 102 may switch from operating at a rich or stoichiometric air/fuel ratio to operating at a lean air/fuel ratio.

The O2 sensors 196, 198 may output a first voltage (e.g., 1000 mV) when the engine 102 operates at a rich air/fuel ratio, and the O2 sensors 196, 198 may output a second voltage (e.g., 0 mV) when the engine 102 operates at a lean air/fuel ratio. The O2 sensors 196, 198 may detect a switch from a rich air/fuel ratio to a lean air/fuel ratio when the output voltage of the O2 sensors 196, 198 crosses a threshold (e.g., 450 mV), which may be predetermined. However, there may be a time lag from a first time when the first O2 sensor 196 detects the switch to a second time when the second O2 sensor 198 detects the switch. The time lag may be a period required for the catalytic converter 162 to absorb oxygen from the exhaust gas to replenish its oxygen storage capacity. Thus, the O2 storage capability module 208 may determine the oxygen storage capability of the catalytic converter 162 based on the time lag.

In one example, when a fuel cutoff event is impending, the fuel control module 206 may increase the fuel delivery amount to operate the engine 102 at a rich air/fuel ratio, and then the fuel control module 206 may decrease the fuel delivery amount to zero. When the fuel delivery amount is decreased to zero, the engine 102 may operate at a lean air/fuel ratio. The first O2 sensor 196 may detect the switch from the rich air/fuel ratio to the lean air/fuel ratio at a first time, and then the second O2 sensor 198 may detect the switch at a second time. The O2 storage capability module 208 may determine the oxygen storage capability of the catalytic converter 162 based on a period from the first time to the second time.

The period may be directly proportional to a temperature of a catalyst in the catalytic converter 162 and inversely proportional to the flow rate of intake air entering the engine 102. Thus, the O2 storage capability module 208 may normalize the period (e.g., adjust the period to a value between 0 and 1) based on the catalyst temperature and the intake air flow rate. The O2 storage capability module 208 may receive the intake air flow rate from the MAF sensor 186. The O2 storage capability module 208 may estimate the catalyst temperature based on the exhaust gas temperature from the EGT sensor 194. Alternatively, the catalyst temperature may be modeled based on engine coolant temperature, ethanol percentage of fuel, air/fuel ratio, vehicle speed, intake air flow, accelerator pedal position, recirculated exhaust gas flow, commanded spark timing, and/or a number of deactivated cylinders. The O2 storage capability module 208 outputs the oxygen storage capability of the converter 162.

A cold start module 210 determines when a cold start is in progress. The cold start module 210 may determine that a cold start is in progress when the engine coolant temperature from the ECT sensor 182 is within a predetermined temperature range (e.g., between −12 degrees Celsius (° C.) and 40° C.) while the engine 102 is started. Additionally or alternatively, the cold start module 210 may determine that a cold start is in progress when the catalyst temperature is less than a predetermined temperature (e.g., 300° C.) while the engine 102 is started. Additionally or alternatively, the cold start module 210 may determine that a cold start is in progress when the engine 102 is started after the engine 102 is shut down for a predetermined period (e.g., 12 hours). The cold start module 210 may determine that a cold start is complete when the catalyst temperature is greater than a predetermined temperature and/or when an engine runtime is greater than a predetermined period. The cold start module 210 may determine when the engine 102 is started and/or the engine runtime based on an input from the driver input module 104. The cold start module 210 outputs a signal indicating whether a cold start is in progress.

An engine speed control module 212 selectively controls the speed of the engine 102 based on engine operating conditions. For example, the engine speed control module 212 may control the engine speed when the engine 102 is idling or coasting down from a speed that is greater than an idle speed. The engine speed control module 212 outputs a desired engine speed. Additionally or alternatively, the engine speed control module 212 may output a difference or error between the engine speed from the engine speed determination module 202 and the desired engine speed.

A throttle control module 214 controls an opening area of the throttle valve 112. The throttle control module 214 may output a desired throttle area, and the throttle actuator module 116 may adjust the throttle valve 112 to achieve the desired throttle area. A spark control module 216 controls spark generation in cylinders of the engine 102. The spark control module 216 may output a desired spark timing, and the spark actuator module 126 may control the spark plug 128 to achieve the desired spark timing.

The throttle control module 214, the fuel control module 206, and the spark control module 216 may adjust the throttle area, the fueling amount, and the spark timing to achieve the desired engine speed and/or to reduce the engine speed error. In addition, the throttle control module 214 and the fuel control module 206 may coordinate the amount of air and fuel delivered to cylinders of the engine 102 to achieve the desired air/fuel ratio. For example, the throttle control module 214 may adjust the throttle area to satisfy a driver torque request, and the fuel control module 206 may adjust the fueling amount to achieve a stoichiometric air/fuel ratio. The throttle control module 214 may receive the driver torque request from the driver input module 104.

To reduce emissions, the engine speed control module 212 may increase the idle speed to a value that is greater than its normal value during a cold start based on the oxygen storage capability of the catalytic converter 162. For example, the engine speed control module 212 may increase the idle speed from a first speed (e.g., 1200 revolutions per minute (RPM)) to a second speed (e.g., 1300 to 1400 RPM) when the oxygen storage capability is less than a predetermined value (e.g. 0.5). In addition, the engine speed control module 212 may adjust the idle speed-based on a predetermined relationship between the oxygen storage capability and the idle speed. For example, the idle speed may be inversely proportional to and linearly or nonlinearly related to the oxygen storage capability.

During normal operation of the engine 102, the spark control module 216 may adjust the spark timing of the engine 102 to a first timing (2 degrees before TDC (° BTC) to 4° BTC). When the engine 102 is idling, the spark control module 216 may retard the spark timing relative to the first timing. For example, the spark control module 216 may adjust the spark timing to a second timing (e.g., −5° BTC to −10° BTC).

To reduce emissions, the spark control module 216 may retard the idle spark timing by an additional amount during a cold start based on the oxygen storage capability of the catalytic converter 162. For example, the spark control module 216 may retard the idle spark timing by an additional amount (e.g., 2 degrees to 3 degrees) when the oxygen storage capability is less than a predetermined value (e.g. 0.5). In addition, the spark control module 216 may retard the spark timing by an amount that is based on a predetermined relationship between the oxygen storage capability and the amount of spark retard. For example, the amount of spark retard may be inversely proportional to and linearly or nonlinearly related to the oxygen storage capability.

During a fuel cutoff event, the engine 102 operates at a lean air/fuel ratio since fuel delivery to one or more cylinders of the engine 102 is stopped. The engine 102 outputs more nitrogen oxide when the engine 102 operates at a lean air/fuel ratio than when the engine 102 operates at a rich air/fuel ratio. In addition, when the engine 102 operates at a rich air/fuel ratio, the engine 102 produces ammonia, which reduces nitrogen oxide. Thus, to reduce nitrogen oxide produced by the engine 102 during a fuel cutoff event, the fuel control module 206 may adjust the fuel delivery amount to yield a rich air/fuel ratio at the completion of the fuel cutoff event.

When the oxygen storage capability of the catalytic converter 162 is at its peak, such as when the converter 162 is new, the converter 162 converts the fuel pulses commanded to enrich the air/fuel ratio of the engine 102 after a fuel cutoff event. As the oxygen storage capability of the catalytic converter 162 decreases due to, for example, aging, the fuel pulses commanded after a fuel cutoff event may break through the converter 162, increasing levels of hydrocarbon emissions. Thus, to balance out nitrogen oxide produced by the engine 102 during a fuel cutoff event, the fuel control module 206 may adjust fuel enrichment after the fuel cutoff event based on the oxygen storage capability of the catalytic converter 162. For example, the fuel control module 206 may adjust the fuel delivery amount to a first amount during normal operation, and the fuel control module 206 may increase the fuel delivery amount by 20 percent relative to the first amount after a fuel cutoff event. However, as the oxygen storage capability of the catalytic converter 162 decreases, the fuel control module 206 may only increase the fuel delivery amount by 10 percent relative to the first amount after a fuel cutoff event.

The fuel control module 206 may decrease the fuel increase amount after a fuel cutoff event when the oxygen storage capability of the catalytic converter 162 is less than a predetermined value (e.g., 0.5). Additionally or alternatively, the magnitude of the decrease in the fuel increase amount after a fuel cutoff event may be based on a predetermined relationship between the oxygen storage capability and the magnitude of the decrease. For example, the magnitude of the decrease may be inversely proportional to and linearly or nonlinearly related to the oxygen storage capability.

Figure 3:
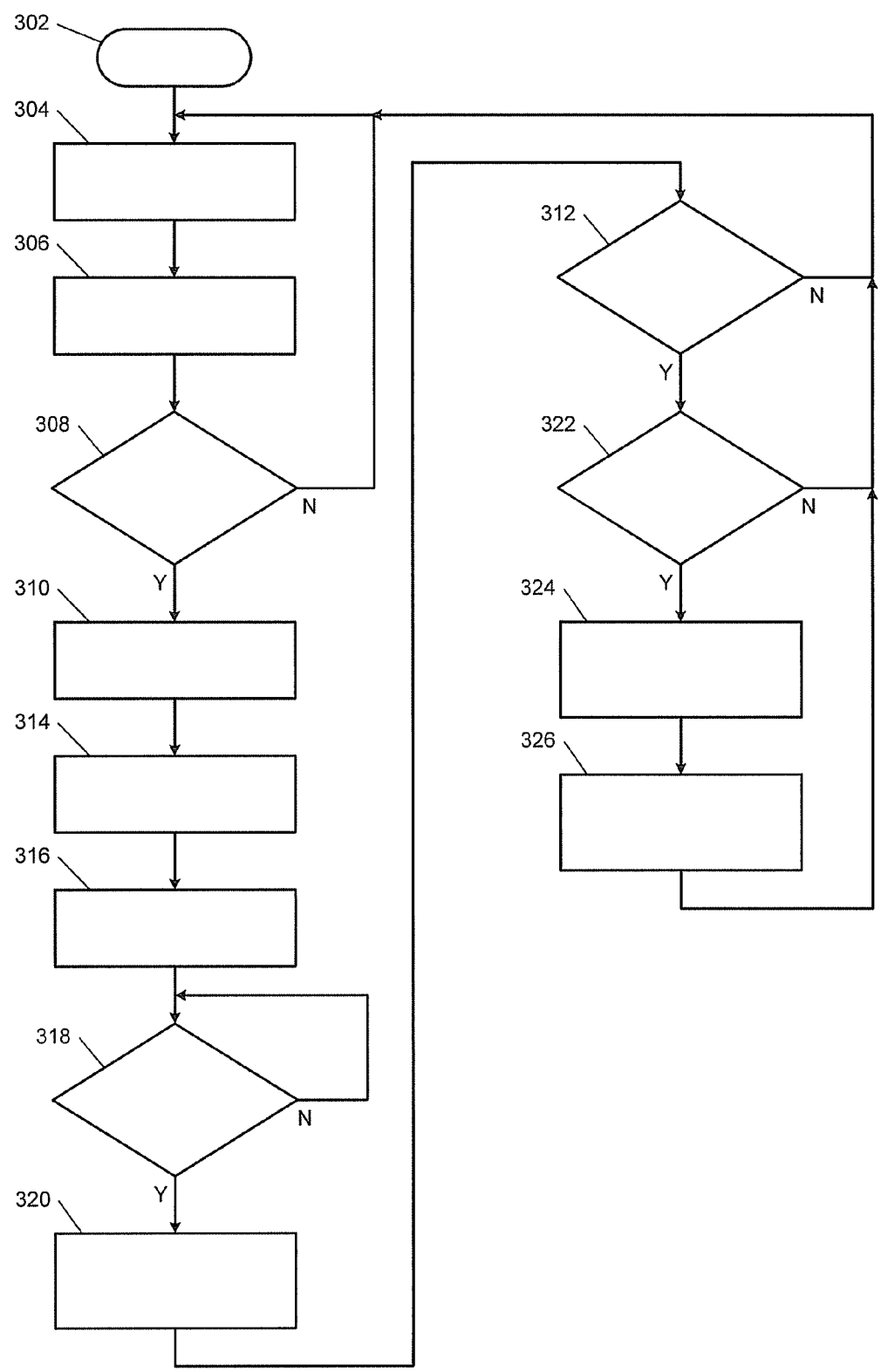
FIG. 3 is a flowchart illustrating an example control method according to the principles of the present disclosure.

Referring now to FIG. 3, a method for controlling an engine based on an oxygen storage capability of a catalytic converter begins at 302. At 304, the method monitors an air/fuel ratio of the engine using a first sensor disposed upstream from the catalytic converter, which may be referred to as a pre-oxygen (pre-O2) sensor. At 306, the method monitors an air/fuel ratio of the engine using a second sensor disposed downstream from the catalytic converter, which may be referred to as a post-oxygen (post-O2) sensor.

At 308, the method determines whether a fuel cutoff event is impending. During a fuel cutoff event, the method stops fuel delivery to one or more cylinders of the engine. If a fuel cutoff event is impending, the method continues at 310. Otherwise, the method continues at 312.

At 310, the method operates the engine at a rich air/fuel ratio. At 314, the method switches the engine operation to a lean air/fuel ratio as the method stops fuel delivery to one or more cylinders of the engine. At 316, the method determines an oxygen storage capability of a catalyst within the catalytic converter based on inputs from the pre-O2 sensor and the post-O2 sensor.

The pre-O2 sensor may detect a switch from a rich air/fuel ratio to a lean air/fuel ratio at a first time, and then the post-O2 sensor may detect the switch at a second time. The method may determine the oxygen storage capability of the catalyst based on a period from the first time to the second time. The period may be directly proportional to a temperature of the catalyst and inversely proportional to an average flow rate of intake air entering the engine. Thus, the method may normalize the period based on the catalyst temperature and the average intake air flow rate.

At 318, the method determines whether the fuel cutoff event is complete. If the fuel cutoff event is complete, the method continues at 320. Otherwise, the method continues to determine whether the fuel cutoff event is complete at 318.

At 320, the method adjusts fuel enrichment after the fuel cutoff event based on the oxygen storage capability of the catalyst. For example, the method may decrease an amount of fuel enrichment after the fuel cutoff event when the oxygen storage capability is less than a predetermined value (e.g., 0.5). Additionally or alternatively, the magnitude of the decrease in the fuel enrichment amount may be based on a predetermined relationship between the oxygen storage capability and the magnitude of the decrease. For example, the magnitude of the decrease may be inversely proportional to and linearly or nonlinearly related to the oxygen storage capability.

At 312, the method determines whether the engine is shutoff. If the engine is shutoff, the method continues at 322. Otherwise, the method continues at 304. At 322, the method determines whether a cold start is in progress. If a cold start is in progress, the method continues at 324. Otherwise, the method continues at 304.

The method may determine that a cold start is in progress when a temperature of the engine is within a predetermined range (e.g., between −12° C. and 40° C.) while the engine is started. Additionally or alternatively, the method may determine that a cold start is in progress when the catalyst temperature is less than a predetermined temperature (e.g., 300° C.) while the engine 102 is started. Additionally or alternatively, the method may determine that a cold start is in progress when the engine is started after the engine is shut down for a predetermined period (e.g., 12 hours). The method may determine that a cold start is complete when the catalyst temperature is greater than a predetermined temperature and/or when an engine runtime is greater than a predetermined period.

At 324, the method adjusts a speed of the engine during the cold start based on the oxygen storage capability of the catalyst. For example, the method may adjust the engine speed to a first speed (e.g., 1200 RPM) when the oxygen storage capability is greater than or equal to a predetermined value (0.5). When the oxygen storage capability is less than the predetermined value, the method may adjust the engine speed to a second speed (e.g., 1250 to 1300 RPM) that is greater than the first speed. In addition, the method may adjust the engine speed based on a predetermined relationship between the oxygen storage capability and the engine speed during a cold start. For example, the engine speed during a cold start may be inversely proportional to and linearly or nonlinearly related to the oxygen storage capability.

At 326, the method adjusts a spark timing of the engine during the cold start based on the oxygen storage capability of the catalyst. For example, the method may retard the spark timing by an additional amount (e.g., 2 degrees to 3 degrees) when the oxygen storage capability is less than a predetermined value (e.g. 0.5). In addition, the method may retard the spark timing by an amount that is based on a predetermined relationship between the oxygen storage capability and the amount of spark retard. For example, the amount of spark retard may be inversely proportional to and linearly or nonlinearly related to the oxygen storage capability.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
    a first oxygen sensor that measures a first oxygen level upstream from a catalytic converter;
    a second oxygen sensor that detects a second oxygen level downstream from the catalytic converter;
    a fuel control module that selectively causes a switch in an air/fuel ratio of an engine from a rich air/fuel ratio to a lean air/fuel ratio; and
    a storage capability module that:
        determines a period from a first time when the first oxygen sensor detects the switch to a second time when the second oxygen sensor detects the switch;
        normalizes the period based on a temperature of a catalyst in the catalytic converter; and
        determines a capability of the catalytic converter to store oxygen based on the period; and
    at least one of:
        an engine speed control module that controls a speed of the engine based on the oxygen storage capability of the catalytic converter; and
        a spark control module that controls a spark timing of the engine based on the oxygen storage capability of the catalytic converter.

2. The system of claim 1 further comprising the spark control module, wherein the spark control module:
adjusts the spark timing to a first timing when a temperature of the engine is greater than a first temperature while the engine is started; and
based on the oxygen storage capability of the catalytic converter, selectively retards the spark timing by a first amount relative to the first timing when the engine temperature is less than or equal to the first temperature while the engine is started.

3. The system of claim 1 further comprising the spark control module, wherein the spark control module selectively retards the spark timing of the engine when the oxygen storage capability of the catalytic converter is less than a predetermined value.

4. The system of claim 1 wherein the storage capability module normalizes the period further based on a flow rate of intake air entering the engine.

5. The system of claim 1 further comprising the engine speed control module.

6. The system of claim 5 wherein the engine speed control module:
adjusts the engine speed to a first speed when a temperature of the engine is greater than a first temperature while the engine is started; and
based on the oxygen storage capability of the catalytic converter, selectively adjusts the engine speed to a second speed that is greater than the first speed when the engine temperature is less than or equal to the first temperature while the engine is started.

7. The system of claim 6 wherein the engine speed control module adjusts the engine speed to the second speed when the oxygen storage capability of the catalytic converter is less than a predetermined value.

8. The system of claim 6 wherein the second speed is inversely proportional to the oxygen storage capability of the catalytic converter.

9. The system of claim 1 wherein the fuel control module controls an amount of fuel delivered to cylinders of the engine based on the oxygen storage capability of the catalytic converter.

10. The system of claim 9 wherein the fuel control module:
adjusts the fuel delivery amount to a first amount to achieve a stoichiometric air/fuel ratio;
adjusts the fuel delivery amount to a second amount that is greater than the first amount after a fuel cutoff event is complete; and
based on the oxygen storage capability of the catalytic converter, selectively decreases the second amount.

11. The system of claim 10 wherein the fuel control module decreases the second amount by a third amount that is inversely proportional to the oxygen storage capability of the catalytic converter.

12. A system comprising:
a first oxygen sensor that measures a first oxygen level upstream from a catalytic converter;
a second oxygen sensor that detects a second oxygen level downstream from the catalytic converter;
a fuel control module that selectively causes a switch in an air/fuel ratio of an engine from a rich air/fuel ratio to a lean air/fuel ratio; and
a storage capability module that determines a capability of the catalytic converter to store oxygen based on a period from a first time when the first oxygen sensor detects the switch to a second time when the second oxygen sensor detects the switch; and
a spark control module that controls a spark timing of the engine based on the oxygen storage capability of the catalytic converter; wherein the spark control module:
adjusts the spark timing to a first timing when a temperature of the engine is greater than a first temperature while the engine is started;
based on the oxygen storage capability of the catalytic converter, selectively retards the spark timing by a first amount relative to the first timing when the engine temperature is less than or equal to the first temperature while the engine is started; and
retards the spark timing relative to the first timing when the oxygen storage capability of the catalytic converter is less than a predetermined value.

13. The system of claim 12 wherein the first amount is inversely proportional to the oxygen storage capability of the catalytic converter.

14. A method comprising:
measuring a first oxygen level upstream from a catalytic converter using a first oxygen sensor;
measuring a second oxygen level downstream from the catalytic converter using a second oxygen sensor;
selectively causing a switch in an air/fuel ratio of an engine from a rich air/fuel ratio to a lean air/fuel ratio; and
determining a capability of the catalytic converter to store oxygen based on a period from a first time when the first oxygen sensor detects the switch to a second time when the second oxygen sensor detects the switch;
controlling a spark timing of the engine based on the oxygen storage capability of the catalytic converter;
adjusting the spark timing to a first timing when a temperature of the engine is greater than a first temperature while the engine is started;
based on the oxygen storage capability of the catalytic converter, selectively retarding the spark timing by a first amount relative to the first timing when the engine temperature is less than or equal to the first temperature while the engine is started; and
retarding the spark timing relative to the first timing when the oxygen storage capability of the catalytic converter is less than a predetermined value.

15. The method of claim 14 wherein the first amount is inversely proportional to the oxygen storage capability of the catalytic converter.

16. A method comprising:
measuring a first oxygen level upstream from a catalytic converter using a first oxygen sensor;
measuring a second oxygen level downstream from the catalytic converter using a second oxygen sensor;
selectively causing a switch in an air/fuel ratio of an engine from a rich air/fuel ratio to a lean air/fuel ratio;
determining a period from a first time when the first oxygen sensor detects the switch to a second time when the second oxygen sensor detects the switch;
normalizing the period based on a temperature of a catalyst in the catalytic converter;
determining a capability of the catalytic converter to store oxygen based on the period; and
at least one of:
controlling a speed of the engine based on the oxygen storage capability of the catalytic converter; and
controlling a spark timing of the engine based on the oxygen storage capability of the catalytic converter.

17. The method of claim 16 further comprising:
controlling the spark timing of the engine based on the oxygen storage capability of the catalytic converter;

adjusting the spark timing to a first timing when a temperature of the engine is greater than a first temperature while the engine is started; and based on the oxygen storage capability of the catalytic converter, selectively retarding the spark timing by a first amount relative to the first timing when the engine temperature is less than or equal to the first temperature while the engine is started.

18. The method of claim 16 further comprising selectively retarding the spark timing of the engine when the oxygen storage capability of the catalytic converter is less than a predetermined value.

19. The method of claim 16 further comprising normalizing the period further based on a flow rate of intake air entering the engine.

20. The method of claim 16 further comprising controlling the engine speed based on the oxygen storage capability of the catalytic converter.

21. The method of claim 20 further comprising:

adjusting the engine speed to a first speed when a temperature of the engine is greater than a first temperature while the engine is started; and based on the oxygen storage capability of the catalytic converter, selectively adjusting the engine speed to a second speed that is greater than the first speed when the engine temperature is less than or equal to the first temperature while the engine is started.

22. The method of claim 21 further comprising adjusting the engine speed to the second speed when the oxygen storage capability of the catalytic converter is less than a predetermined value.

23. The method of claim 21 wherein the second speed is inversely proportional to the oxygen storage capability of the catalytic converter.

24. The method of claim 16 further comprising controlling an amount of fuel delivered to cylinders of the engine based on the oxygen storage capability of the catalytic converter.

25. The method of claim 24 further comprising:

adjusting the fuel delivery amount to a first amount to achieve a stoichiometric air/fuel ratio;

adjusting the fuel delivery amount to a second amount that is greater than the first amount after a fuel cutoff event is complete; and based on the oxygen storage capability of the catalytic converter, selectively decreasing the second amount.

26. The method of claim 25 further comprising decreasing the second amount by a third amount that is inversely proportional to the oxygen storage capability of the catalytic converter.

* * * * *